US008417364B2

(12) United States Patent
Seaman et al.

(10) Patent No.: US 8,417,364 B2
(45) Date of Patent: Apr. 9, 2013

(54) COMPUTER PROGRAM PRODUCT, APPARATUS AND SYSTEM FOR MANAGING A MANUAL ASSEMBLY SEQUENCE

(75) Inventors: James W. Seaman, Falls Church, VA (US); Greg J. Boss, American Fork, UT (US); Peter G. Finn, Brampton, CA (US); Rick A. Hamilton, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 12/025,548

(22) Filed: Feb. 4, 2008

(65) Prior Publication Data

US 2009/0198365 A1    Aug. 6, 2009

(51) Int. Cl.
   *G06F 19/00*       (2011.01)
(52) U.S. Cl.
   USPC ............................................. 700/95
(58) Field of Classification Search ............ 700/95, 700/96, 108, 115, 116
   See application file for complete search history.

(56) References Cited

U.S. PATENT DOCUMENTS

| 5,283,943 | A   | 2/1994  | Aguayo et al. |
|-----------|-----|---------|---------------|
| 5,774,876 | A   | 6/1998  | Woolley et al. |
| 5,910,776 | A   | 6/1999  | Black |
| 5,959,568 | A   | 9/1999  | Woolley |
| 6,138,058 | A   | 10/2000 | Van Antwerp, Jr. et al. |
| 6,434,438 | B1  | 8/2002  | Jin et al. |
| 6,717,512 | B2  | 4/2004  | Boulot |
| 6,847,856 | B1  | 1/2005  | Bohannon |
| 6,968,994 | B1  | 11/2005 | Ashwood Smith |
| 7,069,100 | B2* | 6/2006  | Monette et al. ............... 700/116 |
| 7,103,433 | B1  | 9/2006  | Yuan et al. |
| 7,219,834 | B2  | 5/2007  | Chang |
| 7,441,320 | B2* | 10/2008 | Hass et al. ...................... 29/593 |
| 2002/0177490 | A1 | 11/2002 | Yong et al. |
| 2006/0085087 | A1 | 4/2006  | Hass et al. |

OTHER PUBLICATIONS

Arabe, Katrina C.;"How to Error-Proof the Assembly Line"; Apr. 27, 2004; Industry market trends; pp. 1-3.*
Sirico, Louis; "Introducing RFID Technology"; Jun. 23, 2007; QualityDigest; pp. 1-4.*
Kuren et al. "An Intelligent Disassembly Assistant for Man-Machine Demanufacturing"; Jul. 2005; IEEE; 2005 IEEE/ASME; Internation Conference on Advnaced Intelligent Mechatronics;pp. 1109-1113.*
Strohbach, "A Dispersed Systems Framework for Application Development Bases on Smart Objects", First Year Report for PhD Assessment, May 2003.
Zhekan et al., "Applications of Rfid Technology and Smart Parts in Manufacturing", Proceedings of DETC '04 ASME 2004 Design Engineering Technical Conference and Computers and Information in Engineering Conference, Sep. 2004.

* cited by examiner

*Primary Examiner* — Jeffrey A Gaffin
*Assistant Examiner* — Chad Rapp
(74) *Attorney, Agent, or Firm* — Kunzler Law Group, PC (57) ABSTRACT

A computer program product, apparatus and system are disclosed for managing a manual assembly sequence by electronically referencing unique identifiers associated with physical components to be assembled in the sequence. Certain embodiments facilitate management of an assembly of a consumer product. In one embodiment, RFID tags are used as unique identifiers. Such embodiments may use RFID tags to determine the presence of the components before each assembly step in the assembly sequence and to determine that the components are being assembled in sequence. Other embodiments determine whether the components are properly assembled after being assembled, that the distance between the components falls within a predetermined range, and/or that the components for an assembly steps is properly orientation with respect to other components.

23 Claims, 5 Drawing Sheets

COMPUTER PROGRAM PRODUCT, APPARATUS AND SYSTEM FOR MANAGING A MANUAL ASSEMBLY SEQUENCE

BACKGROUND OF THE INVENTION

1. Field of the Invention

This invention relates to manual assembly processes and more particularly relates to a computer program product, and apparatus, system for managing a manual assembly to assemble a consumer product.

2. Description of the Related Art

A computer program product, apparatus and system are disclosed for managing a manual assembly sequence for assembling a consumer product.

Consumer products are often sold and shipped in a disassembled state to the customer. This saves cost and packaging expenses. Consumer products that are unassembled also permit a customer to more easily transport and move the product in preparation for assembly. Consumer products typically include printed instructions for assembling the consumer product. By following the printed instructions, in the proper sequence, the customer is able to assemble the consumer product.

Printed instructions may include text instructions, pictorial instructions, or a combination of these and may be provided in a variety of languages. Often successful assembly of the consumer product depends on the customer's ability to understand and follow the instructions in the proper sequence. Even carefully drafted instructions may not avoid improper assembly of the consumer product where the consumer is unwilling, inept, or incapable of following the written instructions. Many consumers find written instructions tedious, and difficult to reference, and hence ignore them completely.

Some consumers realize too late that they have incorrectly assembled all or part of the consumer product. Consumers, for instance, may assemble a set of shelves and discover they have glued certain parts together in error. The consumer is then forced to break the parts apart and attempt to reassemble them properly.

In addition, written instructions are limited in their ability to ensure that a consumer is using the proper parts for a particular assembly step. For example, connecting multiple bolts and nuts or other fasteners as part of an assembly step using conventional instructions may result in a consumer choosing the incorrect nuts or bolts and only discovering later that the bolts selected were the wrong length. Consequently, the consumer may have to reverse assembly steps in order to remedy the problem. Finally, written instructions are also limited in their ability to ensure that all the proper parts for the assembly are present in the package for the whole assembly or for a single assembly step. Typically, the user is instructed to verify the presence of the proper parts. However, in products including multiple similar looking parts, this step may be overlooked or not properly followed.

SUMMARY OF THE INVENTION

From the foregoing discussion, it should be apparent that a need exists for a computer program product, apparatus and system that manages a manual assembly sequence. Beneficially, such an apparatus, system, and method would include embodiments that manage the assembly process by verifying the presence of necessary product components before an assembly step begins, verify that components are properly juxtaposed and oriented relative to one other before and after each assembly step in the assembly sequence, instruct the consumer in multiple languages to correct errors made during steps in the assembly sequence, and sequentially present assembly steps to the consumer.

The present invention has been developed in response to the present state of the art, and in particular, in response to the problems and needs in the art that have not yet been fully solved by currently available methods, systems and apparatus. Accordingly, the present invention has been developed to provide an apparatus, system, and method for managing a manual assembly sequence that overcomes many or all of the above-discussed shortcomings in the art.

A computer program product is provided for managing a manual assembly sequence. The computer program product instructs a human assembler to assemble a set of components for an assembly step of an assembly sequence. Each component has at least one unique identifier. Next, the computer program product confirms that the set of components is properly assembled according to the assembly step based on a reading that corresponding unique identifiers of two components of are positioned relative to each other. If the components are properly positioned, the assembly sequence can proceed to a subsequent assembly step. Next, the computer program product instructs the human assembler to assemble the set of subsequent components for the subsequent assembly step according to the subsequent assembly step. The computer program product confirms that the set of subsequent components is properly assembled according to the subsequent assembly step based on a subsequent reading that corresponding unique identifiers of two components of the set of subsequent components are properly positioned relative to each other.

In further embodiments, the computer program product verifies the presence of a set of components for an assembly step of the assembly sequence by referencing the unique identifiers associated with each component. The computer program product may also detect an incorrect component and instruct the human assembler to replace the incorrect component with a missing component that is a member of a component set for a current assembly step. The computer program product may additionally prompt the human assembler to collect a set of subsequent components for the subsequent assembly step, in response to confirmation that the set of components is properly assembled. In one embodiment, the computer program product exclusively presents a single assembly step to the human assembler. In yet another embodiment, the computer program product includes instructions for a single assembly step which includes one or more optional instructions and one or more required instructions.

The computer program product may detect that a set of components is not properly assembled and instruct the human assembler to correct an assembly of the set of components to satisfy the assembly step. This embodiment may also include receiving an override command of an instruction to correct an assembly step from the human assembler. In another embodiment, the computer program product instructs a human assembler by presenting a set of instructions by way of an interface in communication with a computing device executing the computer program product. The computer program product may present the set of instructions in a human language preselected by the human assembler. A set of human instructions may include at least one instruction selected from the group consisting of audio instructions, video instructions, and text instructions.

In one embodiment, the computer program product collects assembly data for each assembly step in the assembly sequence. The computer program product may transmit the assembly data to an external data collector. The unique identifiers may comprise radio frequency identification ("RFID") tags. In certain embodiments, manual assembly of components according the assembly sequence produces a consumer product.

An apparatus to manage a manual assembly sequence is provided with a plurality of modules configured to functionally execute the necessary operations for managing manual assembly according to the assembly sequence. The apparatus in the disclosed embodiments substantially includes the steps necessary to carry out the functions presented above with respect to the operation of the described computer program product. These modules in the described embodiments include an interface module configured to instruct a human assembler to assemble components of each assembly step of an assembly sequence; a verification module configured to generate a verification that an assembly sequence can progress to a subsequent assembly step; and a control module configured to sequentially present the assembly steps of the assembly sequence in response to the verification from the verification module.

The apparatus in one embodiment, includes a scanner configured to detect the unique identifiers of each component. The verification may comprise at least one of presence of one or more components for an assembly step, and confirmation that the components for the assembly step are properly assembled. The apparatus may further include a measurement module configured to measure assembly data, the assembly data including at least one of assembly error rate, presence of incorrect component for an assembly step, the distance between components, and assembly step duration.

A system of the present invention is also presented to manage a manual assembly sequence. The system in the disclosed embodiments substantially includes the components necessary to carry out the functions presented above with respect to the operation of the described computer program product and apparatus. In particular, the system, in one embodiment, includes an assembly sequence comprising a set of assembly steps ordered in sequence such that assembly according to a manual assembly sequence produces a consumer product.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an magnetic, optical, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory) a portable compact disc read-only memory (CD-ROM), an optical storage device or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
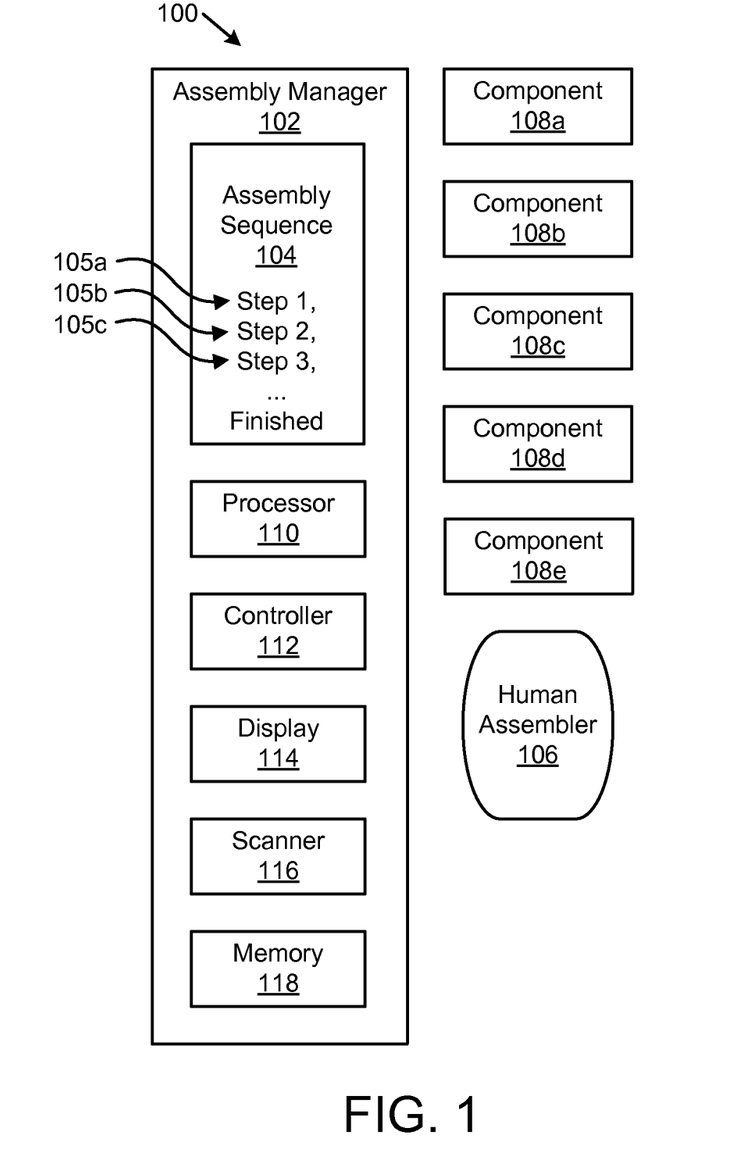
FIG. 1 is a schematic block diagram illustrating one embodiment of a system to manage a manual assembly sequence in accordance with the present invention.

FIG. 1 is a schematic block diagram illustrating one embodiment of a system 100 to manage a manual assembly sequence. The system 100 includes an assembly manager 102, a human assembler 106, and components 108a-e, which are described below.

The assembly manager 102 includes an assembly sequence 104, a processor 110, a controller 112, a display 114, a scanner 116, and a memory 118. In various embodiments, the assembly manager 102 instructs the human assembler 106 to assemble the components 108a-e in accordance with an assembly step in the assembly sequence 104. The assembly manager 102 may also confirm components 108 for an assembly step are properly assembled and prompt the human assembler 106 to collect components for a subsequent assembly step. The human assembler 106 may configure the assembly manager 102 to interface with the human assembler 106 in any one of a variety of different human languages.

The assembly sequence 104 comprises one or more assembly steps 105 specific to assembling a product. In the embodiment, the product is a consumer product, such as a table, a door, a set of shelves, a fence or the like. In other embodiments, the consumer product may comprise a complicated product such as a lawnmower, garage door opener, clock, computer, remote-controlled toy, or the like. In some embodiments, the product may comprise a commercial or industrial product assembled off site, such as a derrick or tower crane, scaffolding, timber or stud frame joists, or the like; or the product may comprise a commercial or industrial product such as a vehicle, or even a set of containers in a freight shipment. One of skill in the art will recognize other examples of products that may be used with the present invention.

The assembly sequence 104 in one embodiment comprises a data structure stored in the memory 118. The assembly sequence 104 may include a series of assembly steps 105 as well as a predefined order for performing the assembly steps 105. The assembly steps 105 of the assembly sequence 104 may comprise text. Alternatively, the assembly steps 105 may comprise other types of data in place of or together with text instructions. Examples of data that may be included in an assembly step 105 include graphic icons, video of another human performing the assembly step, a title for the product, a short demo video clip, images, audio instructions, and the like. A computer-readable medium (integrated or removable) such as a memory card, disk drive, or server accessible over a network may store the assembly sequence 104. In certain embodiments, the text, images, video, and audio portions of the assembly sequence 104 may be available in different user-selectable human languages, such as English, French, Spanish, and the like.

The assembly sequence 104 comprises one or more assembly steps 105. In some embodiments, an assembly step 105 in the assembly sequence 104 may be optional, recommended, or required. Consequently, the assembly manager 102 may permit the human assembler 106 to skip over recommended or optional assembly steps 105. In addition, the assembly manager 102 may require the human assembler 106 to complete required assembly steps 105 in the proper manner and order before proceeding to a subsequent assembly step. The assembly sequence 104, in some embodiments, may require proper orientation of a single component rather than attachment to another component to complete the assembly sequence 104.

The human assembler 106 may program, store, or upload, the assembly sequence 104 into the memory 118 before beginning the assembly process. In this manner, the assembly manager 102 is programmable and "universal" in that the same assembly manager 102 device may be used to assemble a variety of consumer products, provided the proper assembly sequence 104 is available to the human assembler 106.

The human assembler 106 may select from a plurality of assembly sequences 104 customized for users of different technical abilities or preferences. In some embodiments, a human assembler 106 selects an assembly sequence 104 specific to the product being assembled from a plurality of assembly sequences customized for a various consumer products. For example, certain consumer products, such as furniture may include multiple configurations. A different configuration may be obtained by assembling the components 108 provided in one or two, or more, different assembly sequences 104 accessible through the assembly manager 102.

The processor 110 is a computing device well known to those in the art and may include an application-specific integrated circuit ("ASIC"). The processor 110 executes a set of instructions to implement the operations of embodiments of the present invention. The processor 110 interfaces with a controller 112.

The controller 112 reads the assembly steps in the assembly sequence 104 from the memory 118. The controller 112 receives position and presence information from the scanner 116 about the components 108. The controller 112 instructs the human assembler 106 by way of the display 114. In some embodiments, the controller 112 permits the human assembler 106 to override some, or all, of the assembly steps 205 in the assembly sequence 104. In one embodiment, the ability to override an assembly step may depend on the type of assembly step, optional or required.

The display 114 dynamically instructs and prompts the human assembler 106 with visual or tactile images or text, or audio. The display 114 may be digital or analog. In some embodiments, the display may be a cathode ray tube ("CRT"), a liquid crystal display ("LCD"), a plasma display panel ("PDP"), a light emitting diode or series thereof ("LED"), or the like. Alternatively, or in addition, the display 114 may comprise or include an audio speaker for providing audio information. One of skill in the art will recognize other types of displays which may be used in the assembly manager 102 to display necessary information to the human assembler 106.

The scanner 116 references the unique identifiers associated with the components 108a-e to confirm and verify that proper components are used during the manual assembly. The scanner 116 detects the unique identifiers associated with the components 108a-e. Those of skill in the art will recognize that the type of scanner 116 in a particular embodiment depends on the technology used for the unique identifiers. In one embodiment, the scanner 116 references the unique identifiers wirelessly. Examples of a scanner 116 may include a transceiver, a transponder, or the like capable of detecting either passive or active wireless signals. The scanner 116 may comprise a radio frequency identification ("RFID") scanner, or a similar device such as an electronic product code ("EPC") scanner. Other examples of a scanner 116 may include optical impulse readers such as barcode readers, CCD readers, and the like. Still further examples of a scanner 116 include rotary scanners and drum scanners, and magnetic scanners. The scanner 116 may be hand-held or fixed in place. One of skill in the art will recognize other examples of a scanner 116 that may be incorporated into the present invention.

The memory 118 may comprise any suitable computer usable or computer readable medium, examples of which are stated above. The memory 118 may be pre-programmed to contain the assembly sequence 104, or may be programmable.

The human assembler 106 is the person responsible for assembling the components 108. The human assembler 106 interacts with the assembly manager 102 to systematically and properly assemble the consumer product in order and in accordance with the assembly sequence 104.

The components 108 are the physical product components, or parts, necessary for completing of the assembly sequence 104. The components 108a-e may comprise individual parts for use in the assembly sequence 104 or partially assembled sub-assemblies of the product. The term "components" as used herein means indivisible parts, assemblies, and sub-assemblies used in one or more assembly steps of an assembly sequence.

Figure 2:
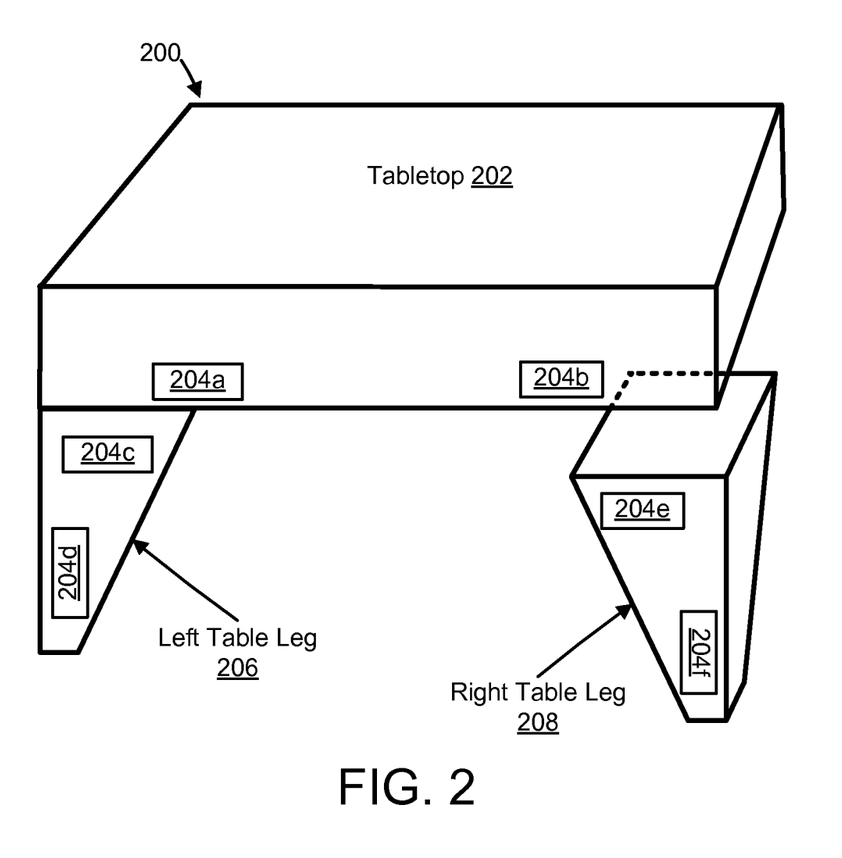
FIG. 2 is a perspective view diagram that illustrates components having unique identifiers suitable for use with one embodiment of the present invention.

FIG. 2 is a perspective view diagram that illustrates a disassembled consumer product 200 comprising components having multiple unique identifiers 204a-f. The disassembled consumer product 200 includes a tabletop 202 having unique identifiers 204a-b strategically coupled to the tabletop 202. Two table legs 206, 208 also include unique identifiers 204. Left table leg 206 is coupled to unique identifiers 204c-d, and right table leg 208 is coupled to unique identifiers 204e-f. The unique identifiers 204c-f on each table leg 206, 208 are also strategically positioned, preferably by a component manufacturer or consumer product manufacturer.

The assembly manager 102 references the unique identifiers 204 to manage the assembly process of the consumer product 200. The assembly manager 102 confirms that the proper components have been selected prior to initiating an assembly step 105. The assembly manager 102 also determines if one or more components are properly oriented, juxtaposed, or positioned during and/or after performance of an assembly step 105.

For example, the assembly manager 102 determines that the left table leg 206 is properly oriented, juxtaposed and attached to the tabletop 202, and that the right table leg 208 is properly oriented and about to be properly juxtaposed and attached by the human assembler 106 to the tabletop 202. The assembly manager 102, using the scanner 116, measures the proximity between unique identifiers 204a-f. The controller 112 matches this proximity against a permitted proximity defined in the assembly sequence 104. In one embodiment, the controller 112 may display information about the accuracy of the component positioning to the human assembler 106.

Unique identifiers 204 permit one part to be distinguished from another and permit the orientation of a part to be determined. A unique identifier 204 may comprise radio-frequency identification ("RFID") tags, bar codes, or the like. The RFID tags may be active, passive, or semi-passive. One of skill in the art will recognize other types of unique identifiers 204 which can be referenced or detected electronically. The unique identifiers 204 may be embossed, attached, coupled, or affixed to product components using a variety of fasteners including screws, tacks, rivets, glue, welding, or the like. Alternatively, the unique identifiers 204 may be associated with components 108a-e indirectly. For instance, the unique identifiers 204 may comprise a label fastened to a bag containing a set of screws or other components, rather than affixed directly to the components 108 themselves.

In one embodiment, the unique identifiers 204a-f are RFID tags. The scanner 116 references the unique identifiers 204a-f by transmitting a radio-frequency signal. The RFID tags signal back by backscattering the carrier wave to the scanner 116. The controller 112 in turn interprets this backscattering to register the presence of the component secured to the unique identifier 204, determine a components' orientation and juxtaposition relative to other components in the product. If controller 112 detects no problems with the existence of the proper component 108a-e, proper orientation, and/or proper juxtaposition relative to a component in the assembly step 105, the controller 112 may instruct the human assembler 106 to proceed to a subsequent assembly step 105 in the assembly sequence 114, or to make corrections to a prior assembly step 105. Advantageously, the human assembler 106 may not be provided with instructions for a subsequent assembly step 105 until the problem is resolved. Such a restriction may be valuable to a manufacture to ensure proper assembly such that warranty claims can be reduced.

Figure 3:
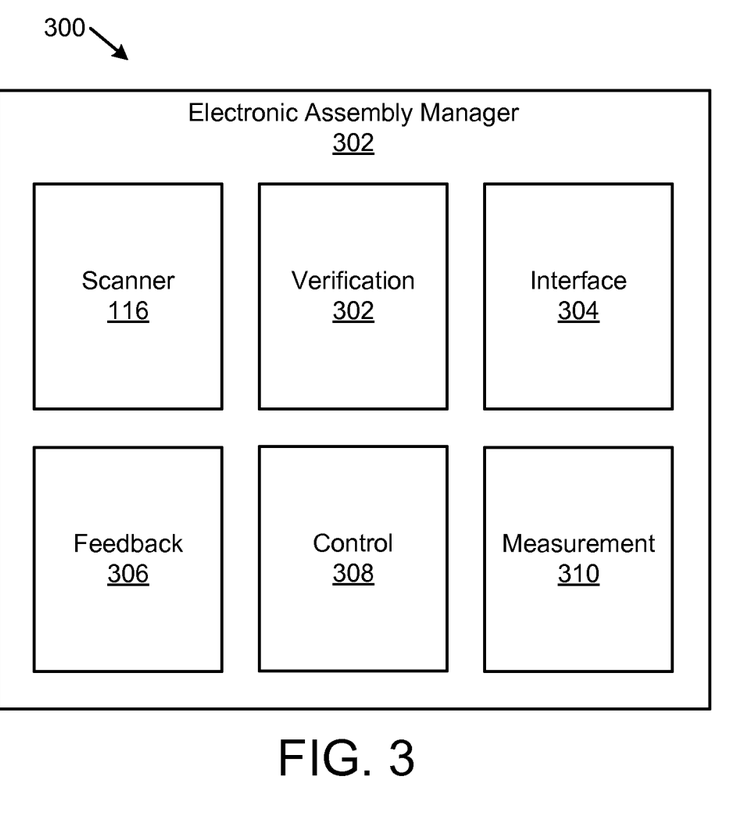
FIG. 3 is a schematic block diagram illustrating one embodiment of a electronic assembly manager in accordance with the present invention.

FIG. 3 is a schematic block diagram illustrating one embodiment of an apparatus 300 to manage a manual assembly sequence. The apparatus 300, in this embodiment, includes the scanner 116 described above, a verification module 302, an interface module 304, a feedback module 306, a control module 308, and a measurement module 310, which are described below.

The scanner 116 references unique identifiers 204 associated with product components 108 assembled by the human assembler 106 in the assembly sequence 104. The scanner 116 is described above. In this embodiment, the scanner 116 communicates information collected from unique identifiers 204 with the verification module 302.

The verification module 302 communicates with the scanner 116 to verify proper completion of an assembly step 105 in the assembly sequence 114. The verification module 302, in one embodiment, also verifies that the components 108 necessary to complete the assembly step 105 are collected. The verification module 302 may detect, using the scanner 116, one of presence of the components for an assembly step 105, a position of each component, and an orientation of each component having at least one unique identifier. Information detected by the verification module 302 is matched against the assembly sequence 104 for compliance and accuracy.

Compliance information may be shared with the human assembler 106 via the interface module 304 in some embodiments, or with the control module 308 in other embodiments. The term "compliance information" as used herein means data relating to the compliance of a component 108 with the assembly sequence 104 or an assembly step 105 in the assembly sequence 104. Compliance information may comprise a boolean value, indicating whether or not an a component 108 required for an assembly step 105 is present within the range of the scanner 116. Compliance information may comprise an angle indicating an orientation of a component in 3D space. Compliance information may comprise a measurement indicating distances between two adjacent components (e.g. the distance between shelves in a product assembly) measurement distances within a predefined range may indicate proper completion of an assembly step 105.

In one embodiment, the verification module 302 includes a memory 118 which stores the assembly sequence 104 for reference. In other embodiments, the verification module 302 may reference the assembly sequence 104 by communicating with an outside data source via a computer network, regulated bus, or the like.

In some embodiments, the verification module 302 communicates a verification to one or more of the feedback module 306, the control module 308, and the measurement module 310. A verification comprises a positive indicator that an assembly sequence can progress to a subsequent assembly step 105 because a previous assembly step 105 has been satisfied. In one embodiment, the assembly step 105 is satisfied by correctly joining the components 108 of the assembly step 105. In another embodiment, the assembly step 105 is satisfied by correctly collecting the components 108 of the assembly step 105.

A verification may also comprise a negative indicator that an assembly sequence can not, or should not, progress to a subsequent assembly step 105 because a previous assembly step 105 has not been satisfied. For example, the wrong component 108 may be present, or two components 108 may be misassembled.

The interface module 304 dynamically instructs and interacts with the human assembler 106 using visual or tactile images or text, or audio. The interface module 304 may include buttons or other user input components such as a keypad or keyboard. The interface module 304 carries out the functions presented above with respect to the operation of the described display 114. The interface module 304 may, in various embodiments, receive instructions from, and communicate with, one or more of the other modules in the apparatus 300.

The feedback module 306 transmits assembly data to an external data collector. The term "assembly data" as used herein means data relating to the assembly of the final product or to the human assembler 106. "Assembly data" includes the compliance information from the verification module 302 as well as other assembly information from the modules in the apparatus 300. The assembly data may include information such as the duration of time the human assembler 106 takes to complete the assembly sequence 104, as well as error rates for the human assembler 106, and/or preferences of the human assembler 106, and the like. The assembly data may also include information about the product, such as serial numbers or date of assembly. The assembly data may also include information about the human assembler 106, such as name, address, product registration information, and/or credit-card information.

The feedback module 306 may store assembly data on computer readable memory for later transmission to the data collector. The data collector, in various embodiments, is external to the apparatus 300. The feedback module 306 may electronically communicate assembly data to the data collector.

The control module 308 coordinates execution and progress through the assembly sequence 104. In various embodiments, the control module 308 instructs the scanner 116 to reference the unique identifier 204. The control module 308, in one embodiment, instructs the human assembler 106 to perform a manual assembly step 105 via the interface module 304. The control module 208 may instruct the measurement module 310 to store, measure or communicate data; and/or to instruct the feedback module 306 to store or communicate assembly data. The control module 308 controls the other modules in the apparatus 300. The controller 112, in one embodiment, may prompt the human assembler 106 to input demographic and/or personal information to the apparatus 300 for transmission by the feedback module 306 to an external data collector. The controller 112 may also generate or gather assembly data information automatically, such as credit-card or date-related information.

The measurement module 310 measures characteristics relating to performance of assembly steps 105 in the assembly sequence 104. Certain measurement data produced by the measurement module 310 may comprise assembly data (described in more detail in relation to FIG. 5) for use by the feedback module 310 The measurement module 310 comprises hardware for calculating the various measurements including a clock, such as a piezoelectric crystal oscillator, or like device, for measuring duration. The measurement module 310, in one embodiment, communicates the assembly data to the feedback module 306.

Figure 4:
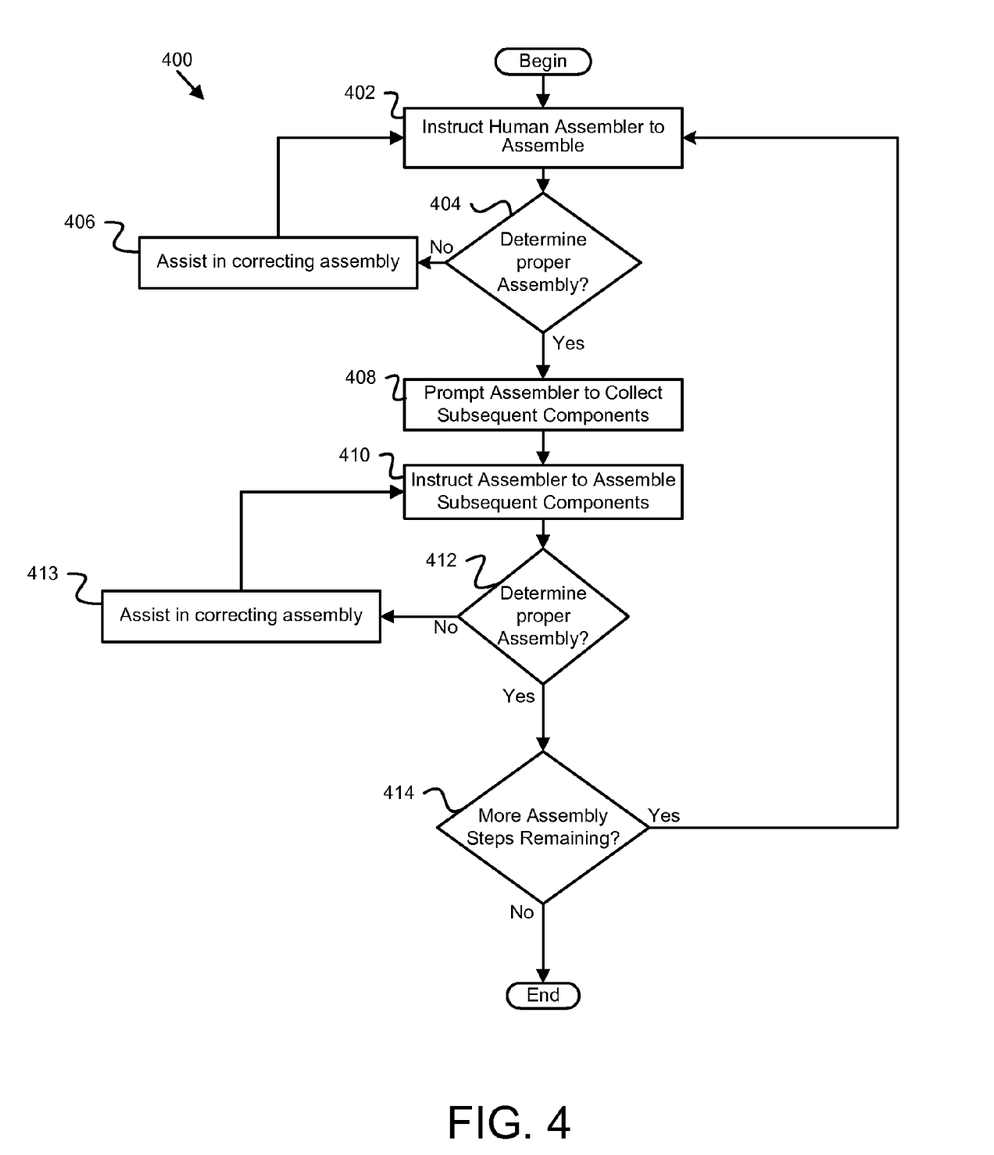
FIG. 4 is a flow chart diagram illustrating one embodiment of a method for managing a manual assembly sequence in accordance with the present invention.

FIG. 4 is a schematic flow chart diagram illustrating one embodiment of a method 400 for managing a manual assembly sequence. The method 400 begins, in this embodiment, by an electronic assembly manager 302 instructs 402 a human assembler 106 to assemble one or more components in accordance with an assembly step 105 in the assembly sequence 104.

Referring now to FIG. 2, suppose a customer (i.e. human assembler 106) uses an embodiment of the invention to assemble a table 200. The first assembly step 105a of the assembly sequence 104 may instruct the customer to connect a left table leg 206 to a tabletop 202. The electronic assembly manager 302 communicates the first assembly step 105a to the customer using text, audio, video, or a combination of these. Alternatively, the first assembly step 105a may instruct the customer to layout the tabletop 202 and left table leg 206 in close proximity such that the scanner 116 can detect the presence of the tabletop 202 and left table leg 206 in order to verify that the correct parts will be used in a subsequent assembly step 105b. In this alternative embodiment, the subsequent assembly step 105b may include the actual joining of the tabletop 202 and left table leg 206. Once a customer has completed an assembly step 105, the customer may indicate completion of the assembly step 105 to the electronic assembly manager 302 by way of a user input such as a button press.

Next, the verification module 302 determines 404 whether the components 108 for the assembly step 105 are properly assembled. To verify proper completion of the assembly step 105, the electronic assembly manager 302 takes a reading of the unique identifiers 204 for all components involved in the assembly step 105. Based on the reading of corresponding unique identifiers 105, the electronic assembly manager 302 determines that the components 108 are positioned relative to each other to satisfy tolerance and positioning requirements defined for the components in the assembly step 105.

In the table assembly example set forth above, the verification module 302 determines that left table leg 206 appears to have been properly connected to tabletop 202 because unique identifier 204c is within a predefined distance of unique identifier 204a. In this manner, the electronic assembly manager 302 verifies that an assembly step 105a is properly completed prior to advancing the assembly sequence 104 to a subsequent assembly step 105b.

If the verification module 302 determines 404 that the components 108 for the assembly step 105 are not properly assembled, the electronic assembly manager 302 assists 406 the customer to correct the improper assembly. In certain embodiments, the electronic assembly manager 302 may provide different levels of assistance to a customer on how to correct the assembly.

In one embodiment, the electronic assembly manager 302 simply indicates that the assembly step 105a is not properly completed and does not provide instructions for a subsequent assembly step 105b until the problem is resolved. In another embodiment, the electronic assembly manager 302 instructs the customer to reverse the assembly step 105b so that the assembly step 105a may be attempted again. In another embodiment, the electronic assembly manager 302 may present an image that indicates what the potential problem may be. In yet another embodiment, the electronic assembly manager 302 determines what mistake has been made based on the unique identifiers 204 for the components 108 of the assembly step 105 and/or unique identifiers 204 for other components 108 that provide clues as to what is incorrect.

In the table example, in order to resolve improper assembly in an assembly step 105, the electronic assembly manager 302 may determine the position of unique identifier 204d relative to unique identifier 204a. Suppose unique identifier 204d is positioned within a predefined tolerance limit for unique identifier 204c. Based on such information, the electronic assembly manager 302 may suggest that the customer has connected the left table leg 206 upside down to the tabletop 202. Consequently, the assembly sequence 104 may include instructions for resolving such an improper assembly. Alternatively, the electronic assembly manager 302 may detect that unique identifier 204c is in close proximity to unique identifier 204b. Based on such information, the electronic assembly manager 302 may suggest that the customer has incorrectly connected the left table leg 206 to the wrong side of the tabletop 202. Consequently, the assembly sequence 104 may include instructions for resolving such an improper assembly. In this manner, the electronic assembly manager 302 identifies a problem in a manual assembly sequence and in certain embodiments may provide instructions for resolving the problem.

If the verification module 302 determines 404 that the components 108 for the assembly step 105a are properly assembled, method 400 proceeds. In one alternative embodiment, the electronic assembly manager 302 may prompt 408 the customer to collect subsequent components for a subsequent assembly step 105b preparatory to completing the subsequent assembly step 105b in the assembly sequence 104. Next, the electronic assembly manager 302 may verify that the subsequent components have been collected. Such verification may be useful to ensure for example that the customer has the correct fasteners for a subsequent assembly step 105.

In another embodiment, the electronic assembly manager 302 may not prompt for collection of subsequent components. Instead, once an assembly step 105 is properly completed, the electronic assembly manager 302 may instruct 410 the customer to assemble the subsequent components.

Next, the verification module 302 determines 412 whether the components 108 for the subsequent assembly step 105 are properly assembled. If not, the electronic assembly manager 302 assists 413 the customer to correct the improper assembly, as discussed above. Once the assistance is provided, the electronic assembly manager 302 reinstructs 410 the customer to assemble the subsequent components.

If the verification module 302 determines 412 that the components for the assembly step 105 are properly assembled, the electronic assembly manager 302 references the assembly sequence 114 to see if there are more assembly steps 105 in the assembly sequence 104. If so, the method 400 advances to instruct 402 the customer to assemble components for a next assembly step 105. If no uncompleted assembly steps 105 remain in the assembly sequence 104 the method 400 ends.

Figure 5:
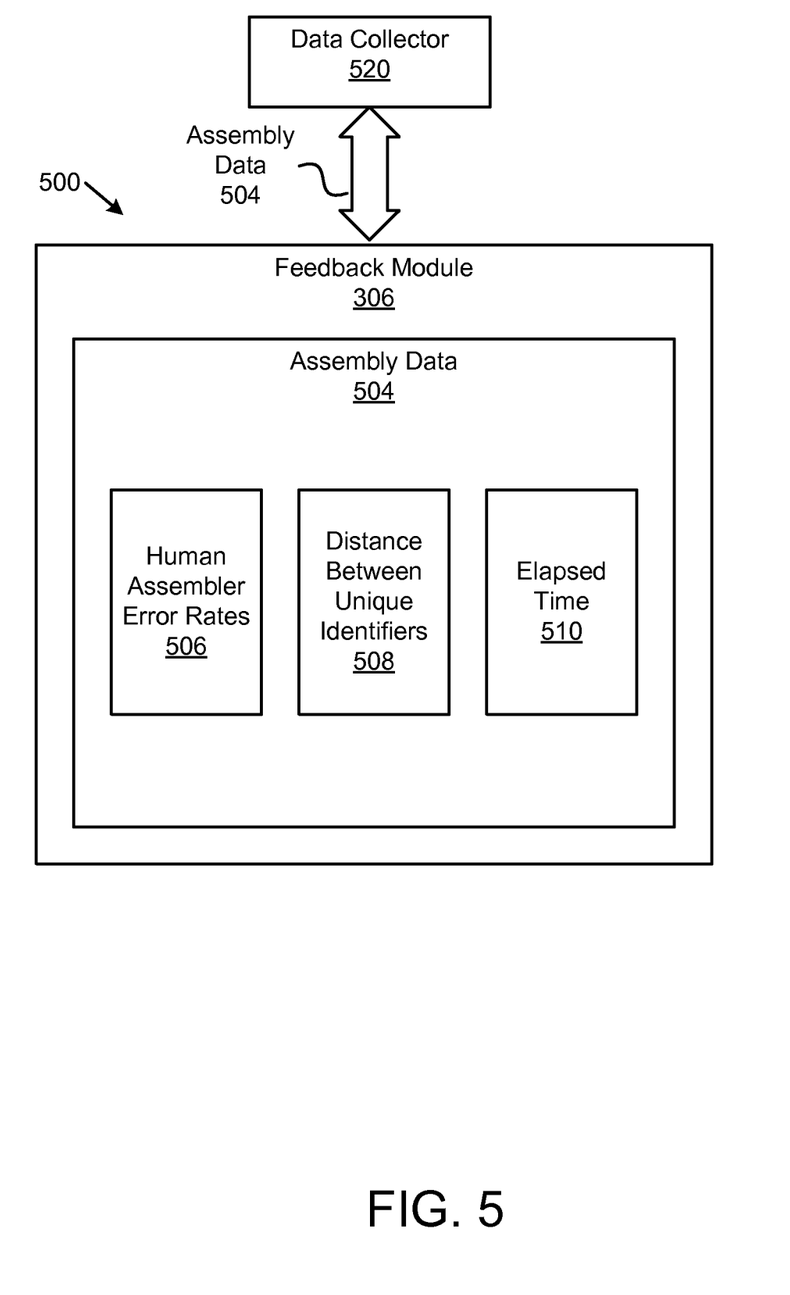
FIG. 5 is a schematic block diagram illustrating a feedback module in accordance with one embodiment of the present invention.

FIG. 5 is a schematic block diagram illustrating a feedback module 306 in accordance with one embodiment of the present invention. In this embodiment, the feedback module 306 relays assembly data 504 to a data collector 520. In this embodiment, the measurement module 310 supplies assembly data 504 to the feedback module 306.

The assembly data 504 comprises data relating to the product and or its assembly. The assembly data 504, in certain embodiments, comprises error rates 506 made by the human assembler 106 during execution of the assembly sequence 104, distance measurements between unique identifiers 508 associated with the components, and elapsed time measurements 510 relating to duration for completion of the assembly sequence 104 and/or individual assembly steps in the assembly sequence 104. The assembly data 504, in a further embodiment, may comprise information collected from the human assembler 106 for use in a product registration process, a home owners' insurance policy, a product warranty, or the like.

One of skill in the art will recognize other types of assembly data 504 that may be collected and used.

The feedback module 306 transmits the assembly data 504 to the external data collector 520. The external data collector 520 comprises an electronic device capable of receiving and storing the assembly data 504.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable storage medium storing computer readable program code, wherein, the computer readable program code when executed by a computer directs the computer to perform operations for managing an assembly sequence, the operations comprising:
in response to a determination that a first set of components is properly assembled, proceeding to a subsequent assembly step if a second set of components is available for the subsequent assembly step; and
wherein the determination is based on a reading that corresponding unique identifiers of the first set of components are positioned relative to each other.

2. The non-transitory computer readable storage medium of claim 1, the operations further comprising verifying a presence of the second set of components for the subsequent assembly step by referencing the unique identifiers associated with each component of the second set of components.

3. The non-transitory computer readable storage medium of claim 1, the operations further comprising detecting an incorrect component and displaying instructions for resolving the incorrect component by replacing the incorrect component with a missing component that is a member of the first set of components.

4. The non-transitory computer readable storage medium of claim 1, the operations further comprising prompting to collect the second set of components for the subsequent assembly step in response to determining that the first set of components is properly assembled.

5. The non-transitory computer readable storage medium of claim 1, the operations further comprising exclusively presenting a corresponding assembly step for the first set of components as a single assembly step to a human assembler.

6. The non-transitory computer readable storage medium of claim 5, wherein the single assembly step comprises one or more of optional instructions and one or more required instructions.

7. The non-transitory computer readable storage medium of claim 5, the operations further comprising receiving an override command of an instruction to correct a corresponding assembly step for the first set of components.

8. The non-transitory computer readable storage medium of claim 1, the operations further comprising instructing a human assembler by presenting an instruction by way of an interface in communication with the computer, the instruction presented in a human language preselected by the human assembler.

9. The non-transitory computer readable storage medium of claim 1, wherein in response to the determination that the first set of components is not properly assembled, displaying instructions for reversing a corresponding assembly step for the first set of components, wherein the instructions for reversing the corresponding assembly step are selected from the group consisting of audio instructions, video instructions, and text instructions.

10. The non-transitory computer readable storage medium of claim 1, the operations further comprising collecting assembly data for the first set of components.

11. The non-transitory computer readable storage medium of claim 10, the operations further comprising transmitting the assembly data to an external data collector.

12. The non-transitory computer readable storage medium of claim 1, wherein the unique identifiers comprise radio frequency identification ("RFID") tags.

13. The non-transitory computer readable storage medium of claim 1, wherein assembling each set of components according to each assembly step produces a consumer product.

14. An apparatus to manage an assembly sequence, the apparatus comprising:
a non-transitory computer-readable medium storing computer readable program code, the computer readable program code comprising:
a verification module determining if a first set of components is properly assembled, wherein the determination is based on a reading that corresponding unique identifiers of the first set of components are positioned relative to each other; and
a control module proceeding to a subsequent assembly step if a second set of components is available for the subsequent assembly step in response to the determination that the first set of components is properly assembled.

15. The apparatus of claim 14, further comprising a scanner configured to detect the unique identifiers of each component.

16. The apparatus of claim 15, wherein the scanner is configured to detect one of a position of each component and an orientation of each component having at least one unique identifier.

17. The apparatus of claim 14, wherein determining if the first set of components is properly assembled comprises verifying at least one of a presence of one or more components of the first set of components for a corresponding assembly step, and a confirmation that the first set of components for the corresponding assembly step is properly assembled.

18. The apparatus of claim 14, further comprising a feedback module configured to transmit assembly data to an external data collector.

19. The apparatus of claim 14, further comprising a measurement module configured to measure assembly data, the assembly data comprising at least one of an assembly error rate, a presence of an incorrect component for a corresponding assembly step for the first set of components, a distance between components, and an assembly step duration.

20. A system to manage a manual assembly sequence, the system comprising:
a first set of components configured for assembly in a first assembly step; and
an electronic assembly manager managing a plurality of assembly steps, the electronic assembly manager comprising:
a processor;
a transceiver configured to wirelessly reference one or more radio frequency identification ("RFID") tag unique identifiers associated with the first set of components;
a memory in communication with the processor, the memory comprising:
a verification module determining if the first set of components is properly assembled according to the first assembly step based on a reading that corresponding unique identifiers of the components are properly assembled; and
a control module proceeding to a subsequent assembly step if a second set of components is available for the subsequent assembly step in response to the determination that the first set of components is properly assembled.

21. The system of claim 20, wherein the transceiver is configured to detect one of a position of each component, and an orientation of each component having at least one unique identifier.

22. The system of claim 20, further comprising a feedback module for displaying assembly data to an external data collector.

23. The system of claim 21, further comprising a measurement module configured to measure assembly data, the assembly data comprising at least one of an assembly error rate, a presence of incorrect component for a corresponding assembly step for the first set of components, a distance between components, and an assembly step duration.

* * * * *